Sept. 29, 1959 L. VALENTINI 2,905,971
METHOD OF MANUFACTURING A PATTERNED RUBBER MAT
Filed Nov. 29, 1956
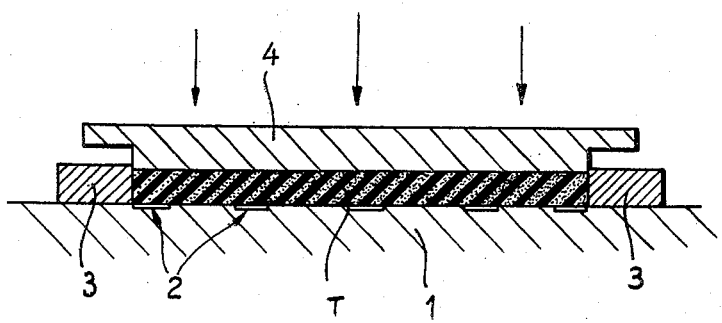

United States Patent Office 2,905,971
Patented Sept. 29, 1959

2,905,971

METHOD OF MANUFACTURING A PATTERNED RUBBER MAT

Luciano Valentini, Turin, Italy

Application November 29, 1956, Serial No. 625,194

Claims priority, application Italy December 1, 1955

1 Claim. (Cl. 18—47.5)

This invention relates to a mat or similar article moulded from a rubber and textile fiber mixture, having a fully smooth outer surface provided with a pattern of a color contrasting in tone with the ground color, and a velvety touch. This result is obtained by a method of manufacture which is a part of this invention.

The method of manufacture of the mat according to this invention comprises the steps of moulding from a rubber and textile fiber mixture a slab, the outer surface of which designed to form the top surface of the mat is provided with projections of small height, such as between 0.1 and 2 mm. arranged on the mat surface so as to form a desired pattern, and of subjecting said surface to a grinding operation which removes not only said projections but also a layer of very slight thickness below the base surface of the mat from which said projections upstand, levelling in this manner the whole mat surface, whereby the fibres embedded in the rubber become exposed on the mat surface.

At the end of the latter step a surprising result is ascertained, inasmuch as the treated surface exhibits the original pattern of the mold in the color of the fibers introduced into the mixture, which somewhat differs from the base hue of the ground corresponding to the color of the molded rubber mixture.

The above described method provides on the mat fully novel attractive effects, such as patterns of various forms or inscriptions in an inexpensive manner on account of the minimum depth of the engraving in the mould which is in low relief, hence very easy and cheap to effect.

An extremely wide variety of effects can be obtained by varying the type and content of textile fiber in the mixture, the color of the fiber, the nature of pigment added to the mixture or the molding pressure.

The drawing shows diagrammatically by way of example a device for carrying out my improved method.

The drawing is a vertical sectional view of the device.

The mold base plate 1 is slightly engraved at 2 to a depth ranging between 0.1 and 2 mm., for instance 1 mm. to reproduce any desired inscription or any geometrical, ornamental or fancy pattern to be transferred on the mat surface.

A mold frame 3 holds the mixture in the mold, the top plate of which is visible at 4.

Upon introducing the mixture T into the recess between the engraved plate 1 and frame 3, the top mold plate 4 is assembled, the assembly is brought into a press and the necessary heat for vulcanisation is supplied.

On completion of vulcanisation the vulcanised rubber plate is removed. The mixture employed contains, as mentioned above, a certain percentage of textile fibres, for instance cotton fibres can be employed in a percentage of, say, 40%.

The resulting slab which exhibits on its lower face in a slight relief the pattern engraved in the mold plate 1 is ground to remove the parts in relief on said face. This confers to the slab a velvety touch similar to suede leather.

The effects obtained are probably due to an accumulation of the fibres contained in the mixture at the engraving in the mold during compression in the press, which leaves at the surface a shaded effect of the pattern. A certain veined aspect of the ground is probably due to the fact that the textile fibers in the mixture never mix in a thoroughly uniform manner.

Although the above described example relates to molding of the rubber mixture in a press, the method can be employed also where molding is effected continuously between the rollers of a calender. One of the two rollers has then engraved therein the pattern desired on the finished article.

A self-vulcanising mixture can be employed for vulcanising the mixture or, alternatively, the molded article can be placed in a kier for vulcanising.

The molding pressure can be varied within wide limits.

It was ascertained in practice that the use of a molding pressure of the order of 2 kgs. per square centimeter yields in the finished article a very sharp contour of the pattern. By increasing the molding pressure the contour of the pattern becomes less sharp. By operating with pressures of the order of, say, 30–40 kgs. per sq. centimeter, a pattern with a contour gradated into the remaining surface of the molded article is obtained. According to the desired effect, molding is therefore carried out at low or high pressure.

What I claim is:

A method of manufacturing a mat with a pattern on one surface thereof, comprising the steps of providing a mold having a cavity for molding the mat therein as a slab and having an internal cavity surface with a selected pattern engraved thereon to a limited depth of 0.1 to 2 millimeters for forming said pattern on the mat, filling the mold with a rubber and textile fiber mixture, vulcanizing the mixture under pressure to form a slab, removing the vulcanized slab from the mold, grinding the surface of the molded slab having the pattern formed thereon in a slight relief corresponding to the engraving in the mold and thoroughly levelling said entire surface, whereby the ground surface assumes a velvet-like finish and the pattern remains imprinted thereon.

References Cited in the file of this patent

UNITED STATES PATENTS

| | | |
|---|---|---|
| 101,823 | Cheever | Apr. 12, 1870 |
| 1,305,621 | Prince | June 3, 1919 |
| 1,881,337 | Willis | Oct. 4, 1932 |
| 2,002,792 | Sart | May 28, 1935 |
| 2,362,340 | Bacon | Nov. 7, 1944 |